United States Patent
Kalman et al.

(10) Patent No.: US 11,949,455 B2
(45) Date of Patent: Apr. 2, 2024

(54) BIT-WISE INVERSE MULTIPLEXING FOR OPTICAL CHANNELS UTILIZING MICROLEDS

(71) Applicants: Robert Kalman, Mountain View, CA (US); Bardia Pezeshki, Mountain View, CA (US); Alexander Tselikov, Mountain View, CA (US)

(72) Inventors: Robert Kalman, Mountain View, CA (US); Bardia Pezeshki, Mountain View, CA (US); Alexander Tselikov, Mountain View, CA (US)

(73) Assignee: Avicena Tech Corp., Sunnyvale, CA (US)

( * ) Notice: Subject to any disclaimer, the term of this patent is extended or adjusted under 35 U.S.C. 154(b) by 0 days.

(21) Appl. No.: 17/805,445

(22) Filed: Jun. 3, 2022

(65) Prior Publication Data
US 2022/0393768 A1   Dec. 8, 2022

Related U.S. Application Data

(60) Provisional application No. 63/197,263, filed on Jun. 4, 2021.

(51) Int. Cl.
*H04B 10/50*   (2013.01)
*H04B 10/25*   (2013.01)
*H04B 10/508*   (2013.01)

(52) U.S. Cl.
CPC ........... *H04B 10/502* (2013.01); *H04B 10/25* (2013.01); *H04B 10/508* (2013.01)

(58) Field of Classification Search
None
See application file for complete search history.

(56) References Cited

U.S. PATENT DOCUMENTS

| | | | |
|---|---|---|---|
| 5,617,417 A | 4/1997 | Sathe et al. | |
| 6,985,503 B1 | 1/2006 | DeGrandpre et al. | |
| 10,498,452 B1* | 12/2019 | Bonar | H04B 10/502 |
| 2002/0080441 A1* | 6/2002 | Beisel | H04Q 11/0478 |
| | | | 398/56 |
| 2003/0169780 A1 | 9/2003 | Kukic | |
| 2004/0028084 A1* | 2/2004 | Cao | H04J 3/0629 |
| | | | 370/517 |
| 2005/0122978 A1 | 6/2005 | Nicholson | |
| 2006/0140626 A1* | 6/2006 | Robinson | H04B 10/077 |
| | | | 398/30 |

(Continued)

OTHER PUBLICATIONS

International Search Report on related PCT Application No. PCT/US2022/072763 from International Searching Authority (KIPO) dated Sep. 27, 2022.

(Continued)

*Primary Examiner* — David W Lambert
(74) *Attorney, Agent, or Firm* — KOS IP Law LLP

(57) ABSTRACT

An optical communication system may include microLEDs for use in communicating data between chips or multi-chip modules. The number of microLEDs may be greater than a number of electrical data lines for carrying data to be communicated. Signals on the electrical data lines may be inverse multiplexed, for example to allow for operation of the microLEDs at a rate slower than operation of electrical circuitry generating signals on the electrical data lines.

8 Claims, 9 Drawing Sheets

(56) References Cited

U.S. PATENT DOCUMENTS

| | | |
|---|---|---|
| 2009/0296737 A1 | 12/2009 | Arye |
| 2010/0111525 A1* | 5/2010 | Ford .................. H04J 14/00 |
| | | 398/43 |
| 2011/0274435 A1* | 11/2011 | Fini ................... H04J 14/025 |
| | | 398/139 |
| 2012/0183290 A1 | 7/2012 | Schunk |
| 2016/0209865 A1 | 7/2016 | Gusat et al. |
| 2018/0123693 A1 | 5/2018 | Yang |
| 2019/0257927 A1* | 8/2019 | Yao .................... G01S 17/931 |

OTHER PUBLICATIONS

Written Opinion on related PCT Application PCT Application No. PCT/US2022/072763 from International Searching Authority (KIPO) dated Sep. 27, 2022.

* cited by examiner

BIT-WISE INVERSE MULTIPLEXING FOR OPTICAL CHANNELS UTILIZING MICROLEDS

CROSS-REFERENCE TO RELATED APPLICATION(S)

This application claims the benefit of U.S. Provisional Patent Application No. 63/197,263, filed on Jun. 4, 2021, the disclosure of which is incorporated by reference herein.

BACKGROUND OF THE INVENTION

Electronic devices with integrated circuits in semiconductor chips are ubiquitous. The semiconductor chips perform a variety of logic operations, including calculation functions, and often provide for memory storage related to those operations.

The semiconductor chips are generally within semiconductor packages, with the semiconductor packages mounted to a printed circuit board or the like. The semiconductor packages may contain a single semiconductor chip or, multiple semiconductor chips, for example in what is often termed a multi-chip module. Multi-chip modules may allow for use of semiconductor chips of smaller size, potentially increasing effective manufacturing yield, while still allowing for provision of increased functionality within a single semiconductor package.

Many devices include several semiconductor packages on a circuit board, and some devices may even include multiple circuit boards. Unfortunately, transmission of electrical signals across a circuit board may pose problems for proper device operation. Metal signal traces on or in a circuit board generally have a discrete resistances and capacitances that increase with trace length, and the traces may be considered lengthy, particularly considering operating speeds of the integrated circuits in the semiconductor chips. The resistances and capacitances may result in undue signal loss, signal delay, and possibly other problems. These problems may be exacerbated for signals that are routed between circuit boards.

Overcoming issues relating to signal loss and signal delay may result in increased power consumption in generating signals that are to traverse portions of the circuit board, or from circuit board to circuit board, as well as possibly increased power consumption in operating circuitry in a receiving chip to recover received signals. Moreover, operations of the integrated circuits in one semiconductor package may depend on signals received across the circuit board, for example processor operations dependent on information in memory in another semiconductor package. Delays in electrical transmission of those signals across the circuit board may effectively limit speed of those operations, and possibly the device as a whole.

BRIEF SUMMARY OF THE INVENTION

Some aspects provide a method of providing inverse-multiplexed optical data transmission, comprising: demultiplexing each of a plurality of serial input electrical data signals for transmission to form a plurality of parallel input electrical data signals, with corresponding parallel input electrical data signals for each of the serial input data signals; driving microLEDs of an array of microLEDs to emit light based on the parallel input electrical data signals; passing the light through cores of a multicore fiber, with light from different LEDs passing through different cores of the multicore fiber; forming parallel output electrical data signals by an array of photodetectors receiving the light passed through the cores of the multicore fiber; and multiplexing the parallel output electrical data signals to form serial output electrical data signals.

In some aspects the array of microLEDs comprises a plurality of sub-arrays of microLEDs, and each of the corresponding parallel input electrical data signals are provided to different ones of the sub-arrays of microLEDs. In some aspects the array of photodetectors comprises a plurality of sub-arrays of photodetectors, and each of the sub-arrays of photodetectors receives light emitted by a corresponding one of the sub-arrays of microLEDs. Some aspects further comprise, for each sub-array of microLEDs, driving a microLED of the array of microLEDs with an input electrical clock signal, passing light emitted by the at least one microLED driven by the input electrical clock signal through at least one core of the multicore fiber, and forming an output electrical clock signal by at least one photodetector of a corresponding one of the sub-arrays of photodetectors. Some aspects further comprise, for each sub-array of microLEDs, latching the parallel input electrical data signals using the input electrical clock signal, and for the corresponding one of the sub-arrays of photodetectors, latching the parallel output electrical data signals using the output electrical clock signal. In some aspects different photodetectors of a one of the sub-arrays of photodetectors receives light emitted by a corresponding different one of the microLEDs of the corresponding one of the sub-arrays of microLEDs. Some aspects further comprise driving at least one microLED of the array of microLEDs with an input electrical clock signal, passing light emitted by the at least one microLED driven by the input electrical clock signal through at least one core of the multicore fiber, and forming an output electrical clock signal by at least one photodetector of the array of photodetectors. Some aspects further comprise latching at least one of the parallel input electrical data signals using the input electrical clock signal, and latching at least one of the parallel output electrical data signals using the output electrical clock signal.

Some aspects provide an optical communication apparatus for transmitting inverse-multiplexed data, comprising: an inverse multiplexer having an input for the one or more serial input electrical signals and configured to produce parallel input electrical signals; transmitter circuitry configured to receive the parallel input electrical signals and drive microLEDs to produce a parallel optical signals; a first optical coupling assembly to couple light from the microLEDs to a first end of a multicore fiber; a second optical coupling assembly to couple light from a second end of the multicore fiber to photodetectors to produce parallel output electrical signals; and a multiplexer having a plurality of inputs configured to receive the parallel output electrical signals and convert the plurality of parallel output electrical signals to serial output electrical signals. Some aspects further comprise a latch to latch the parallel input electrical signals based on a clock signal. Some aspects further comprise: an error-correcting code (ECC) encoder, the ECC encoder configured to generate error correction electrical signals based on the parallel input electrical signals, and wherein the transmitter circuitry is further configured to receive the error correction electrical signals and drive additional microLEDs to produce error correction optical signals, and wherein the parallel optical signals include the error correction optical signals; and an ECC decoder, the ECC decoder configured to correct errors in the parallel output electrical signals. In some aspects the inverse multiplexer is configured to produce the plurality of parallel input electrical signals bytewise.

These and other aspects of the invention are more fully comprehended upon review of this disclosure.

DETAILED DESCRIPTION

Figure 1A:
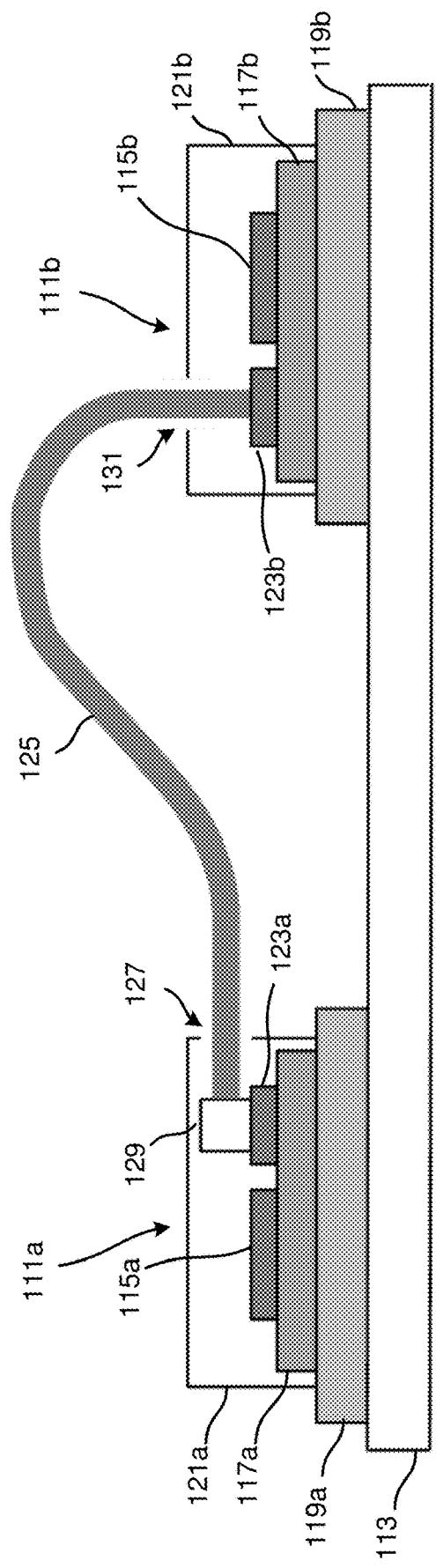
FIG. 1A is a semi-block diagram, semi-side view of optically interconnected semiconductor packages on a circuit board, with an optical transceiver chip on an interposer, in accordance with aspects of the invention.

FIG. 1A is a semi-block diagram, semi-side view of optically interconnected semiconductor packages on a circuit board, with an optical transceiver chip on an interposer. FIG. 1A shows first and second multi-chip modules (MCMs) 111a, b mounted on a circuit board 113, which may be a printed circuit board. In some embodiments the MCMs may be mounted to separate circuit boards. Each MCM may be mounted to the circuit board by way of balls, with the balls providing for passage of electrical signals from the MCMs to the circuit board. The balls may be, for example, solder balls, which may be part of a ball grid array. Although only two MCMs are shown on the circuit board, in many embodiments the circuit board may have more MCMs, as well as a variety of single chip packages, discrete circuit elements, for example inductors and capacitors, and possibly a variety of connectors.

The first and second MCM each include a plurality of semiconductor chips. In FIG. 1A, a first 115a, b of the semiconductor chips includes integrated circuits configured, variously, for logic, processing, memory, or other operations. Although for each MCM only a single first of the semiconductor chips are shown, in some embodiments one or more of the MCMs may include a plurality of such semiconductor chips.

The semiconductor chips in each MCM are shown mounted on an interposer 117a,b respectively. The interposers are each on a package substrate 119a,b. A package cover or housing 121a,b is mated to the package substrate about edges of the package substrate, with the package cover having an interior cavity. The package cover and package substrate therefore form a semiconductor package which houses and generally encloses the interposers and semiconductor chips. Generally the interposer includes vias, and possibly redistribution layers, for passage of electrical signals between the semiconductor chips and to vias of the package. The vias of the package, in turn, are generally coupled to the solder balls electrically coupling the semiconductor packages to the circuit board.

The first and second MCMs also include semiconductor chips in the form of optical transceiver chips 123a,b. In the embodiments discussed herein the optical transceiver chips may be comprised of silicon semiconductor chips, with LEDs placed directly or indirectly on the silicon semiconductor chips. The optical transceiver chips may be termed an optical transceiver IC (OTRIC) at times. The optical transceiver chips are shown as mounted on the interposers, with the optical transceiver chips also within the semiconductor packages. The optical transceiver chips are electrically coupled to the first of the semiconductor chips in their respective packages by way of the interposers. The electrical couplings, which may include traces on or within the interposers, allow for passage of signals between the semiconductor chips and the optical transceiver chips.

The optical transceiver chips include circuitry for driving LEDs to generate light encoding data provided to the optical transceiver chips from the other semiconductor chips. The optical transceiver chips also include circuitry for amplifying and, in some embodiments, variously processing signals from photodetectors. The LEDs (not shown in FIG. 1A) may be microLEDs in various embodiments, and the LEDs may be mounted on the optical transceiver chip or on a substrate mounted to the optical transceiver chip. In some embodiments the LEDs are on what may be considered an upper surface of the optical transceiver chips, namely a surface away from the interposer on which the optical transceiver chips are mounted. The photodetectors may be formed in the optical transceiver chip, for example about the surface of the optical transceiver chip, or be mounted to the surface of the optical transceiver chip. In some embodiments the photodetectors are on or in what may be considered the upper surface of the optical transceiver chips.

In various embodiments discussed herein the LEDs are microLEDs. In some embodiments a microLED is made from a p-n junction of a direct-bandgap semiconductor material. In some embodiments a microLED is distinguished from a semiconductor laser (SL) as follows: (1) a microLED does not have an optical resonator structure; (2) the optical output from a microLED is almost completely spontaneous emission, whereas the output from a SL is dominantly stimulated emission; (3) the optical output from a microLED is temporally and spatially incoherent, whereas the output from a SL has significant temporal and spatial coherence; (4) a microLED is designed to be driven down to a zero minimum current, whereas a SL is designed to be driven down to a minimum threshold current, which is typically at least 1 mA. In some embodiments a microLED is distinguished from a standard LED by (1) having an emitting region of less than 10 μm×10 μm; (2) frequently having cathode and anode contacts on top and bottom surfaces, whereas a standard LED typically has both positive and negative contacts on a single surface; (3) typically being used in large arrays for display and interconnect applications.

A multicore fiber 125 is used in optically coupling the LEDs and photodetectors of the optical transceiver chip of the first MCM and the LEDs and photodetectors of the optical transceiver chip of the second MCM. In FIG. 1A, the first MCM includes an aperture 127 in a side of the package, with the multicore fiber passing through the aperture in the side of the package. A first end of the multicore fiber is positioned to receive light from and pass light to the LEDs and photodetectors by way of direction changing coupling optics 129 of the first MCM. The direction changing coupling optics are within the semiconductor package for the first MCM. In FIG. 1A, the direction changing coupling optics are shown as being on the upper surface of the optical transceiver chip. Also as shown in FIG. 1A, the first end of the multicore fiber is positioned to receive and provide light horizontally, at 90 degrees from a surface of a plane generally defined by a top of the optical transceiver chip.

The multicore fiber may include a large number of cores for transmission of signals from the LEDs associated with each optical transceiver chip and the PDs of the other optical transceiver chip. As the maximum widths of the LEDs and PDs may be relatively small, for example under 100 um in some embodiments and under 50 um in other embodiments, a large number of optical channels may be provided between the two optical transceiver chips. In some embodiments the number of available optical channels (for example, in some embodiments a link between an LED on one optical chip and a PD on the other optical chip) is two times or more as great as a desired number of channels, in some embodiments the number of available optical channels is 8 times or more as great as a desired number of channels, and in some embodiments the number of optical channels is 16 times or more as great as a desired number of optical channels. In some embodiments, therefore, data electronically provided to the optical transceiver chips on a single electrical channel (which may include data provided as a differential signal in some embodiments) may be inverse multiplexed, for example on a bit-wise basis between multiple optical channels.

In addition or instead, in some embodiments one or some of the optical channels may be used for transmission of parity bits, redundant bits, or clock signals. In some embodiments the LEDs driven to generate light carrying data for a single electrical signal or sufficiently closely packed that skew across the different light signals is sufficiently small that a single clock signal may be used to recover data from that light. For example, it is believed that for adjacent LEDs with a width of 10 um, a spacing of 30 um between centers of the LEDs is sufficiently small that skew across the different light signals generated by the LEDs is effectively non-existent.

Also in FIG. 1A, the second MCM includes an aperture 131 in a top of the package, with the multicore fiber passing through the aperture in the top of the package. The second MCM does not include direction changing coupling optics. Instead, a second end of the multicore fiber is positioned to receive light from and pass light to the LEDs and photodetectors of the second optical transceiver chip. In some embodiments the second MCM may instead have the multicore fiber passing through an aperture in the side of the package, and include the direction changing coupling optics of the first MCM. Conversely, in some embodiments the first MCM may have the multicore fiber passing through an aperture in the top of the package, and not include the direction changing coupling optics.

Figure 1B:
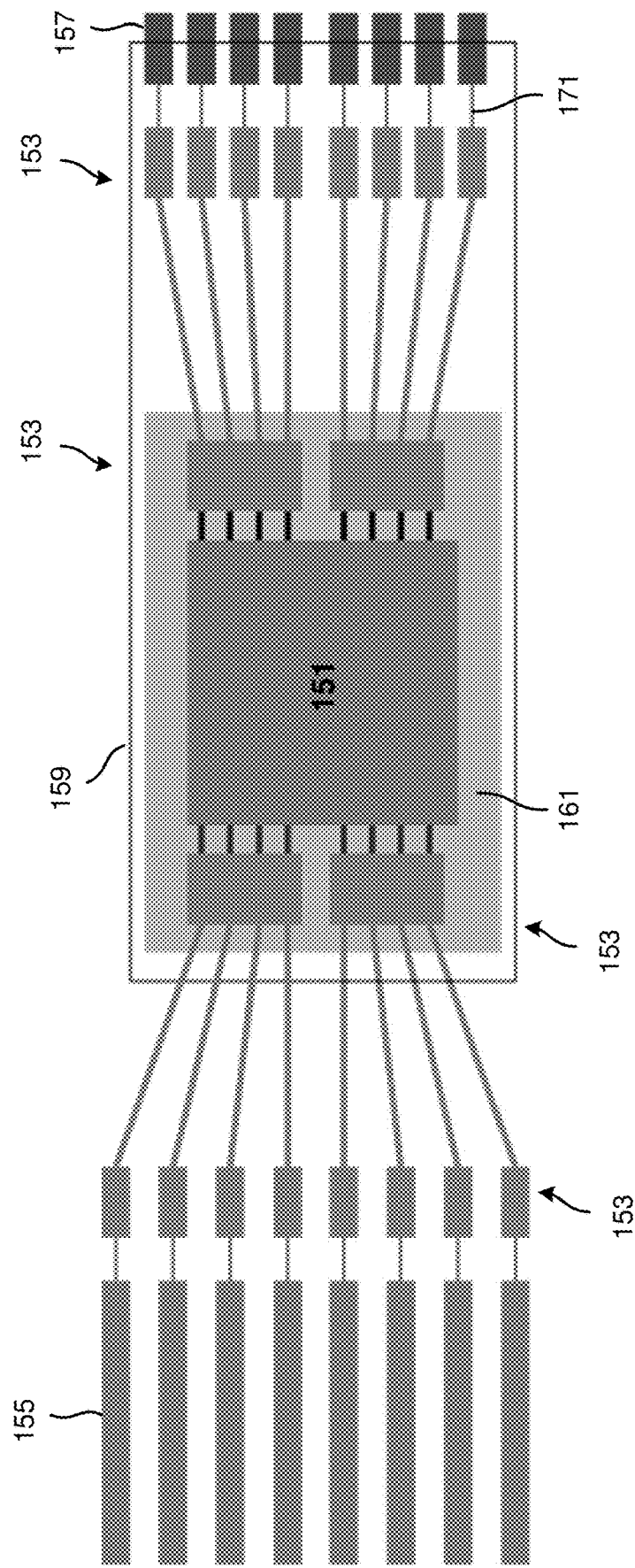
FIG. 1B shows an embodiment in which an IC chip may be coupled to a plurality of optical transceiver chips, in accordance with aspects of the invention.

FIG. 1B shows an embodiment in which an IC chip 151 may be coupled to a plurality of optical transceiver chips 153. The IC chip may be a switch chip, as shown in FIG. 1B. The switch chip, or switch IC, may perform routing of data, for example in a data center or network routing node. The switch chip may be coupled to a plurality of network interface cards (NICs) 155, as well as a plurality of pluggable optical modules 157. The NICs and pluggable optical modules may be at or near edges of computer enclosures holding the switch chip. As shown in FIG. 1B, the pluggable optical modules are at an edge of a chassis 159 holding the switch chip, while the NICs are outside of the chassis. The switch chip may route data between, variously, the NICs and the pluggable optical modules.

In FIG. 1B, a plurality of optical transceiver chips may be used in coupling the switch chip and the NICs, and a plurality of optical transceiver chips may be used in coupling the switch chip and the pluggable optical modules. A plurality of optical transceiver chips are mounted within the chassis, about the switch chip. In some embodiments the optical transceiver chips may be mounted to a same substrate 161 as the switch chip. Multicore fibers link some of the optical transceiver chips about the switch chip to optical transceiver chips about the pluggable optical modules. The pluggable optical modules and the optical transceiver chips about the pluggable optical modules may communicate using, for example, a GUAI interface 171. Similarly, multicore fibers link others of the optical transceiver chips about the switch chip to optical transceiver chips of or about the NICs, with an electrical interface between those optical transceiver chips and the NICs.

Figure 2:
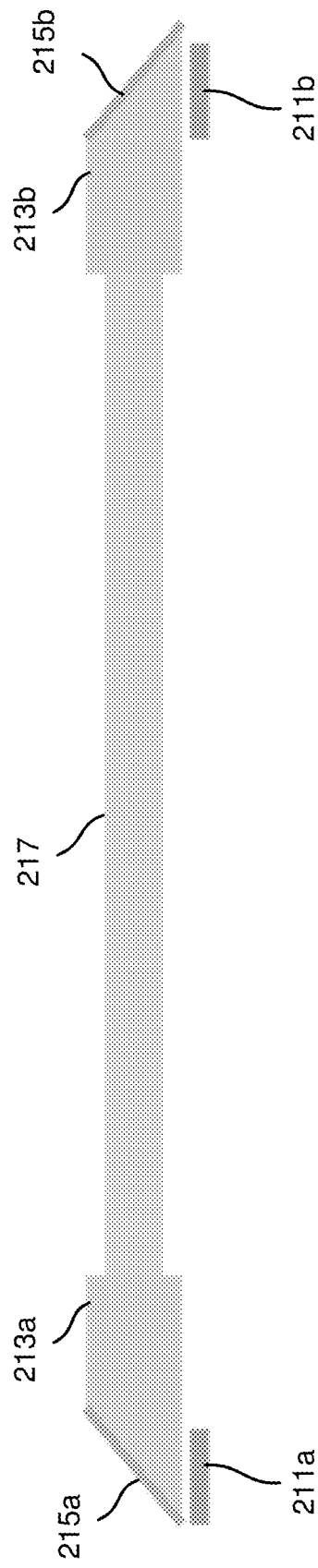
FIG. 2 shows a parallel optical interconnect using a fiber bundle, In accordance with aspects of the invention.

In some embodiments the multicore fiber may be arranged as a fiber bundle. FIG. 2 shows a parallel optical interconnect using a fiber bundle. The parallel optical interconnect is shown as connecting two semiconductor packages. The semiconductor packages may be packages for a single semiconductor chip, or, in many embodiments, may be packages of multi-chip modules. The packages may be on a same substrate in some embodiments. In some embodiments the packages may be on different circuit boards in a same computer equipment enclosure. The packages each include a transceiver array 211a, b. Each transceiver array may include light emitters and/or photodetectors on a top side (as illustrated in FIG. 2) of an integrated circuit chip or die (which may be referred to as an IC). In some embodiments the photodetectors may be integrated into the IC. The IC may be a separate transceiver IC in the package, or the IC may be an IC with other functions, for example processing or memory functions.

The light emitters, for example microLEDs, and photodetectors are positioned for, respectively, provision or reception of light in a direction towards or from what may be considered a top of their respective packages. Coupling optics 213a,b within the package, however, direct the light so that the light transfers instead through a connection in a side wall of the packages. The coupling optics may include a mirror 215a,b to redirect light by ninety degrees. Transfer of the light through the connection in the side wall of the packages may be beneficial in avoiding interference with placement of heat transfer elements that may be present on a top side of the packages, for example.

A fiber bundle 217 couples to the coupling optics of each of the semiconductor packages. The fiber bundle includes a plurality of fiber cores for transfer of light between opposing ends of the fiber bundle, and thence to and from the coupling optics. With the fiber bundle including a plurality of cores, the fiber bundle may be considered a multicore fiber. The fiber bundle may include a plurality of sub-bundles, each of which includes a plurality of fiber cores. In some embodiments light emitters and/or photodetectors in each package are arranged in an array, with each array including a plurality of sub-arrays of light emitters and/or photodetectors. In some embodiments each sub-array is associated with a corresponding fiber sub-bundle, with the fiber sub-bundle carrying light for that sub-array. In some embodiments each sub-array is associated with a single electrical data channel, for example an electrical data channel. In some embodiments data for the single electrical data channel is bit-wise inverse multiplexed across each sub-array, with for example each sub-array providing bit-wise inverse multiplexed data in parallel. In some embodiments each sub-array may provide a clock signal, to be carried by the fiber sub-bundle, for the data of the sub-array.

Figure 3A:
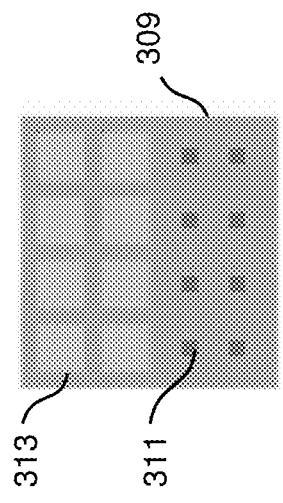
FIGS. 3A and 3B show a top view of a transceiver IC with LEDs and photodetectors, in accordance with aspects of the invention.
Figure 3B:
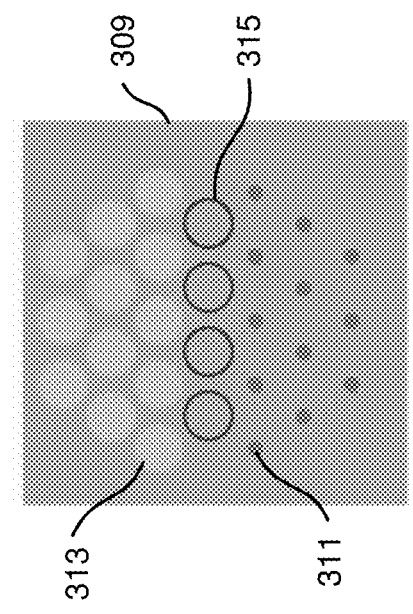

FIGS. 3A and 3B show a top view of a transceiver IC 309 with LEDs and photodetectors. The LEDs 311 and photodetectors 313 may be referred to collectively as "optoelectronic elements" herein. In some embodiments, the optoelectronic elements in a sub-array may be arranged in a regular pattern, e.g., a square as shown in FIG. 3A, rectangular, or HCP. In some embodiments, emitter widths are smaller than PD widths. Smaller emitter widths may allow for higher coupling efficiency to the fiber bundle using per-emitter collection optics that preserve source etendue by allowing the beam to expand while reducing its angular spread. Using PDs with large widths may enable relaxed (i.e. larger) translational alignment tolerances for the PDs relative to the fiber bundle. In some embodiments, some subset of the optoelectronic elements may be on a regular grid with some omitted elements. For example, FIG. 3B shows PD and emitter elements on a HCP grid with some omitted elements 315.

Figure 4:
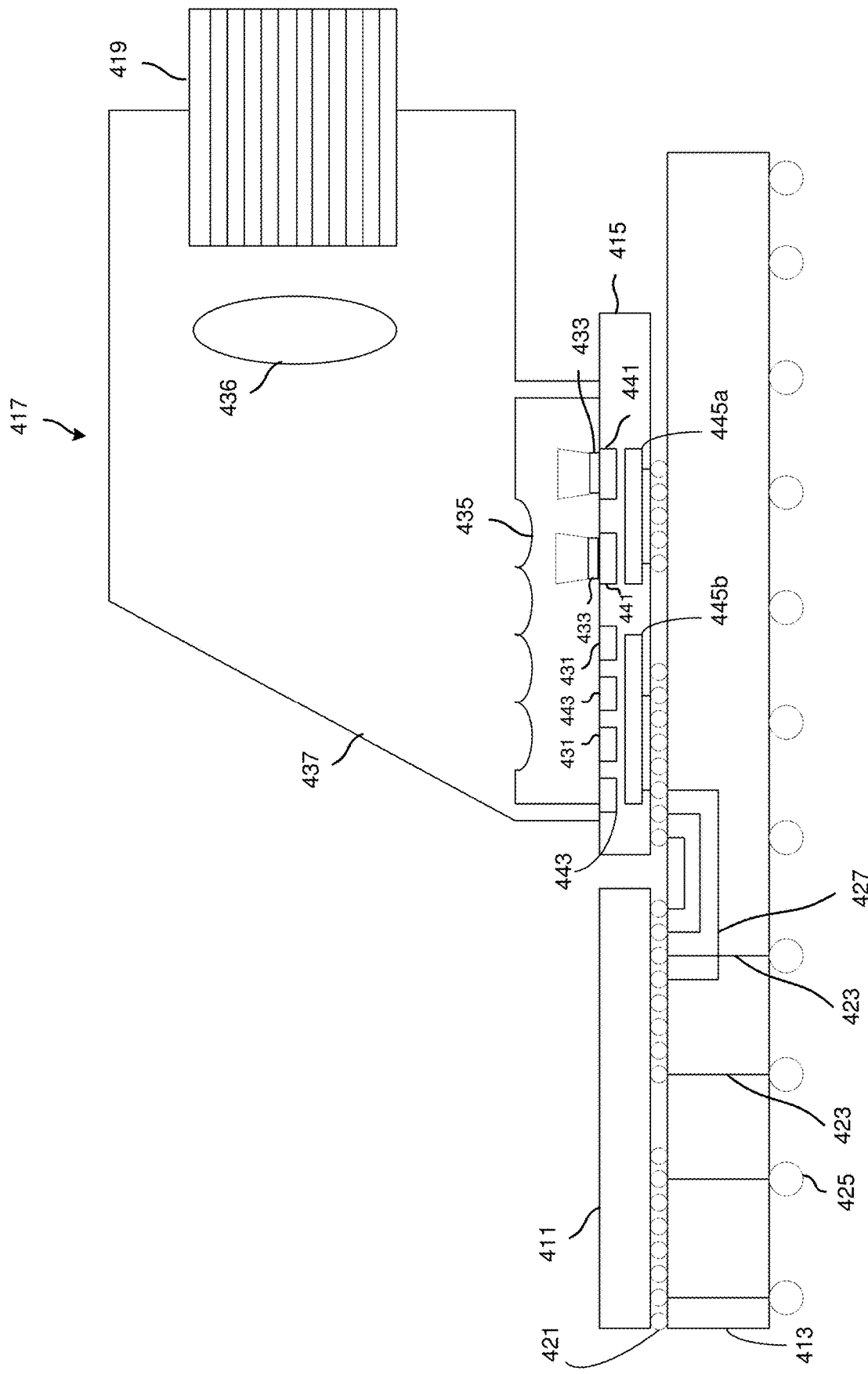
FIG. 4 shows an example of a system-on-chip (SOC) mounted on an interposer with an optical transceiver chip, in accordance with aspects of the invention.

FIG. 4 shows an example of a system-on-chip (SOC) 411 mounted on an interposer 413 with an optical transceiver chip 415. The example of FIG. 4 also provides an example of coupling optics 417 for coupling to a multicore fiber 419. The multicore fiber may extend through a sidewall of a semiconductor package containing the SOC, optical transceiver chip, and interposer. The SOC is mounted to pads on the interposer with solder bumps 421. Some of the pads connect to through-substrate vias (TSVs) 423 that, in turn, may connect to the package via solder bumps 425. Other pads of the interposer connect to traces 427 in metal signal layers of the interposer providing connections to the optical transceiver chip.

The optical transceiver chip includes at least one array of LEDs and PDs, with FIG. 4 symbolically showing just a pair of PDs 431 and a pair of LEDs 433. The PDs are shown as monolithically integrated in the optical transceiver chip, with the LEDs mounted on top of the optical transceiver chip. The LEDs may be microLEDs. A coupling optic is provided over the PDs and LEDs. The coupling optic links light from the LEDs to a multicore fiber, and links light from the multicore fiber to the PDs. The multicore fiber is mounted to an end of the coupling optic, with the multicore fiber extending substantially parallel to a plane defined by the interposer. The coupling optic is shown as including embedded lenses 435 facing the LEDs and PDs, with a lens per LED or PD. In various embodiments the lenses may be on a per array or per sub-array basis instead. The coupling optic is also shown as including a lens 436 for providing light to and from the multicore fiber, which may be a fiber bundle with fiber sub-bundles. A 45 degree turning mirror 437 is formed on another end of the coupling optic, away from the multicore fiber. The 45 degree turning mirror is optically between the LEDs/PDs and the multicore fiber, such that the turning mirror redirects light 90 degrees so as to optically couple the LEDs/PDs and multicore fiber. (For clarity of showing LEDs and PDs, in FIG. 4 the turning mirror is not shown as extending over all of the LEDs, etc., although that is actually the case, so as to provide the optical coupling discussed above).

The optical chip transceiver includes driver circuitry 441 for driving the LEDs, and transimpedance amplifier circuitry 443 for amplifying signals from the PDs. In addition, the optical transceiver chip includes other circuitry 445a, b, for example to perform bit-wise inverse multiplexing for signals to be used to drive the LEDs, and inverse bit-wise multiplexing for signals received by the PDs.

Figure 5:
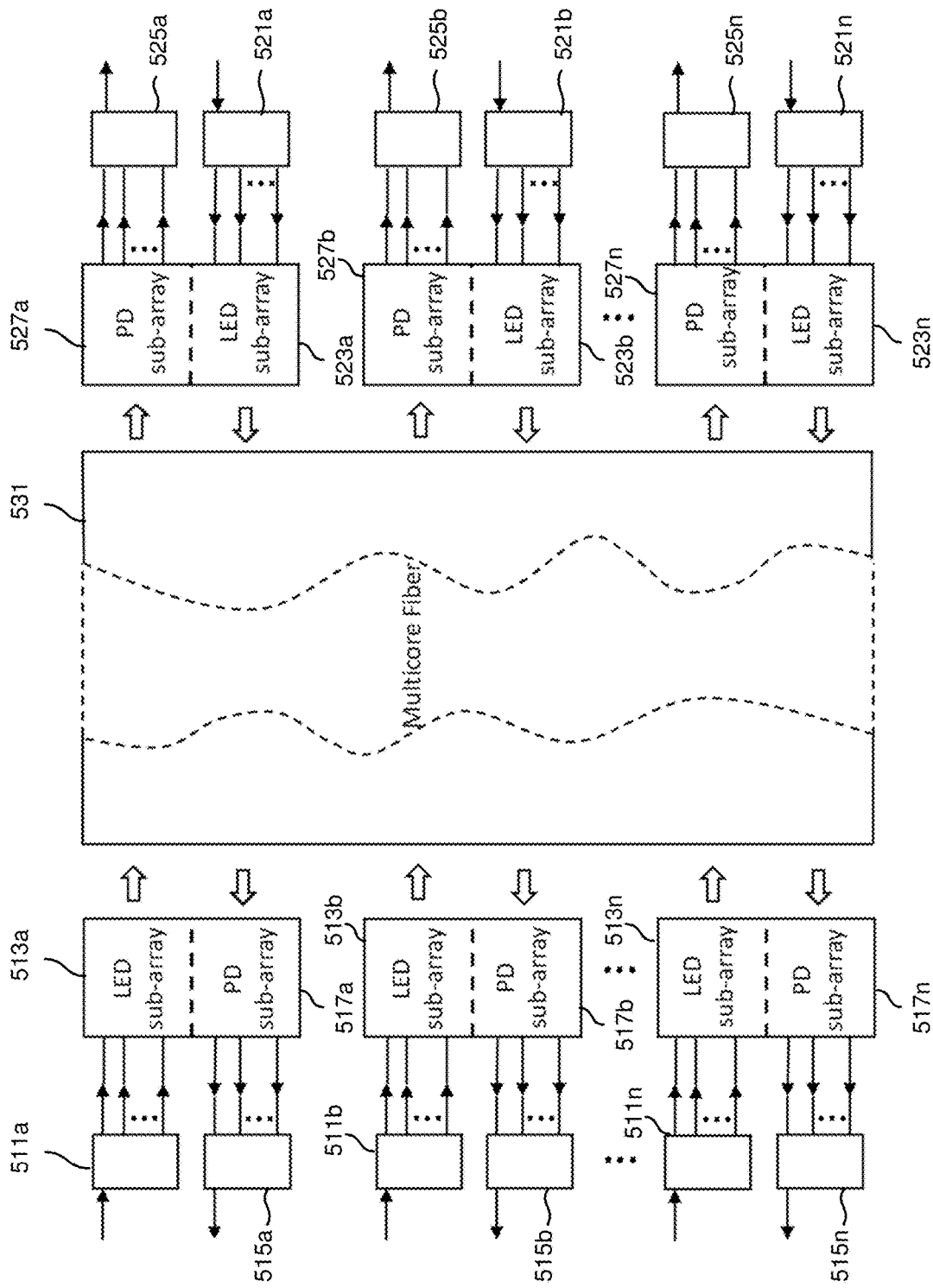
FIG. 5 is a block diagram of an embodiment of an inverse-multiplexed microLED parallel optical interconnect, in accordance with aspects of the invention.

FIG. 5 is a block diagram of an embodiment of an inverse-multiplexed microLED parallel optical interconnect. In some embodiments, an inverse-multiplexed microLED parallel optical interconnect (POI) comprises: one or more input electrical signals, each of which is input to an inverse multiplexer circuit; each of the output electrical signals is input to an optical transmitter comprising a transmitter circuit that drives a microLED; each microLED is coupled by some optical coupling assembly into one or more cores of a multicore optical fiber assembly; at the far end of the multicore fiber assembly, the light associated with each microLED is coupled onto a photodetector by some optical assembly; the electrical output of each photodetector is attached to a receiver circuit that comprises a transimpedance amplifier (TIA), and may also comprise limiting amplifier stages, clock recovery, retiming, and other circuitry; the outputs of N receiver circuits are input to a multiplexer circuit; the outputs of the multiplexer circuits comprise the outputs of the interconnect system. In FIG. 5, demultiplexers 511a-n, 521a-n, which can be considered inverse multiplexers, provide data to LED sub-arrays 513a-n, 523a-n, while multiplexers 515a-n, 525a-n serialize data from PD sub-arrays 517a-n, 527a-n. LEDs and PDs of corresponding LED sub-arrays and PD sub-arrays are optically coupled by cores of a multicore fiber 531. The data provided to each of the demultiplexers, and provided by each of the multiplexers, may correspond to data of a single data line. The single data line may be one line of parallel data lines, for example 8 or 16 parallel data lines.

In some embodiments of an inverse-multiplexed microLED POI, the output of each inverse multiplexer circuit comprises a clock signal in addition to multiple data signals, and the clock signal is carried on its own lane through the optical interconnect subsystem.

Figure 6A:
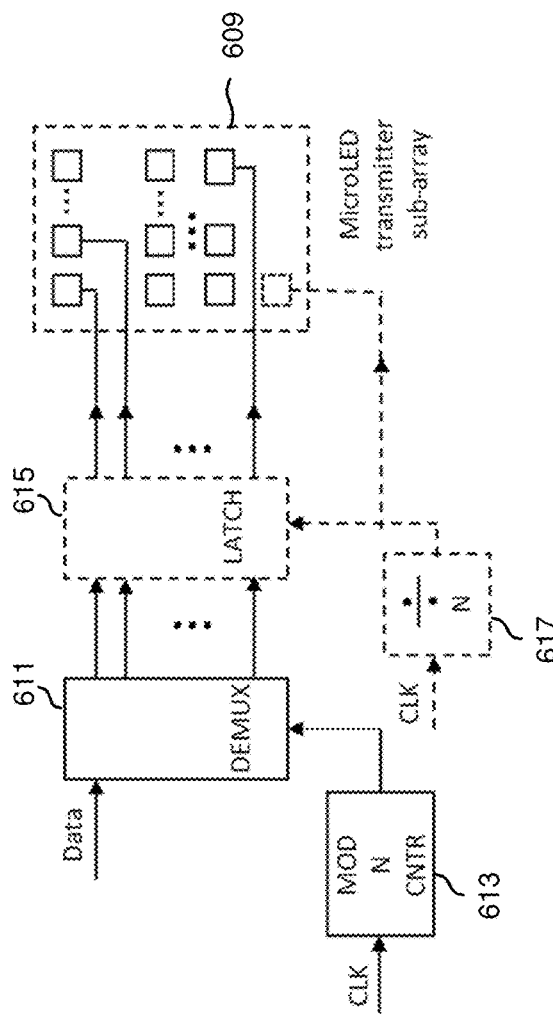
FIG. 6A shows an embodiment of an inverse multiplexer connected to an LED sub-array that is part of a microLED POI, in accordance with aspects of the invention.

FIG. 6A shows an embodiment of an inverse multiplexer connected to an LED sub-array 609 that is part of a microLED POI. In some embodiments the inverse multiplexer may be the inverse multiplexer of FIG. 5. The input data is connected to a demultiplexer (demux) 611 with N output data lines. The demux is controlled by a Mod N counter 613 that has a data clock as its input. The output of the counter determines which of the demux outputs each input bit is mapped to. In some embodiments, each demux output is connected directly to an optical transmitter input. In some embodiments, the output data from the demux may be latched by latch 615 that is clocked by the input data clock divided by N counter 617 to clock the latch that latches the demux outputs. Each latch output is connected to an optical transceiver input. In some embodiments the input clock (divided by N) is also provided to the LED sub-array, for transmission over the multicore fiber.

Figure 6B:
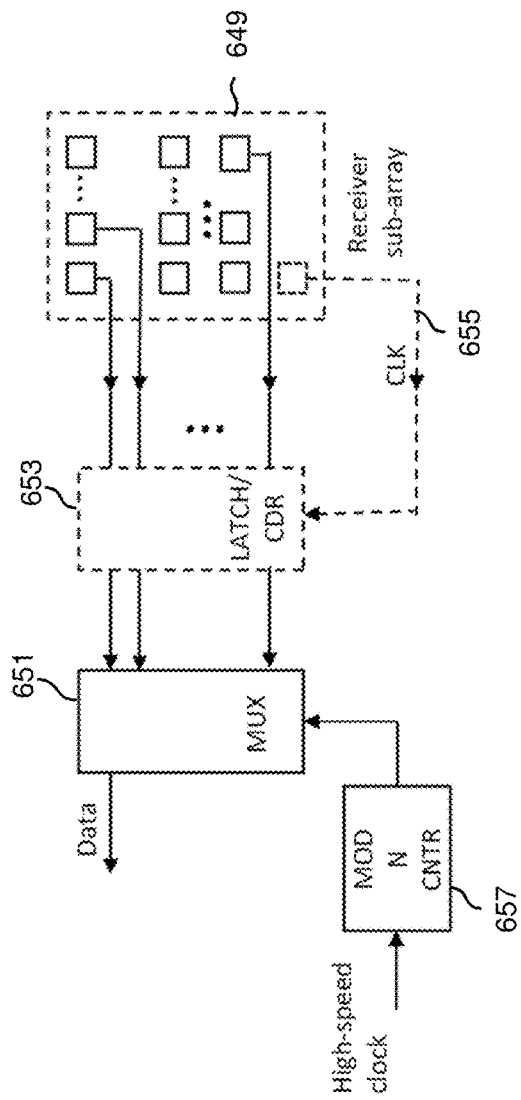
FIG. 6B shows an embodiment of a multiplexer connected to a receiver sub-array, in accordance with aspects of the invention.

FIG. 6B shows an embodiment of a multiplexer (mux) that is connected to a receiver sub-array 649. In some embodiments the multiplexer 651 may be the multiplexer of FIG. 5. Each output line from the optical receiver sub-array may be connected to a mux input. Alternatively, a latch 653 may be interposed between the optical receiver array and the mux. The outputs of the receiver sub-array may comprise a line that carries the clock (divided by N) 655. This clock line is connected to the clock input of the latch. Each latch output is connected to a mux input. The mux is controlled by a Mod N counter 657 that has a high-speed clock (operating at the speed of the mux output data). The mux output is the desired data output.

In some embodiments, the inverse multiplexing is done bitwise so that each successive bit in the input data stream is mapped to a different output line than the previous bit. In some embodiments, the inverse multiplexing is done bytewise so that all bits in each input data stream byte are mapped to the same output line, and each successive byte is mapped to a different output line than the previous byte.

Figure 7:
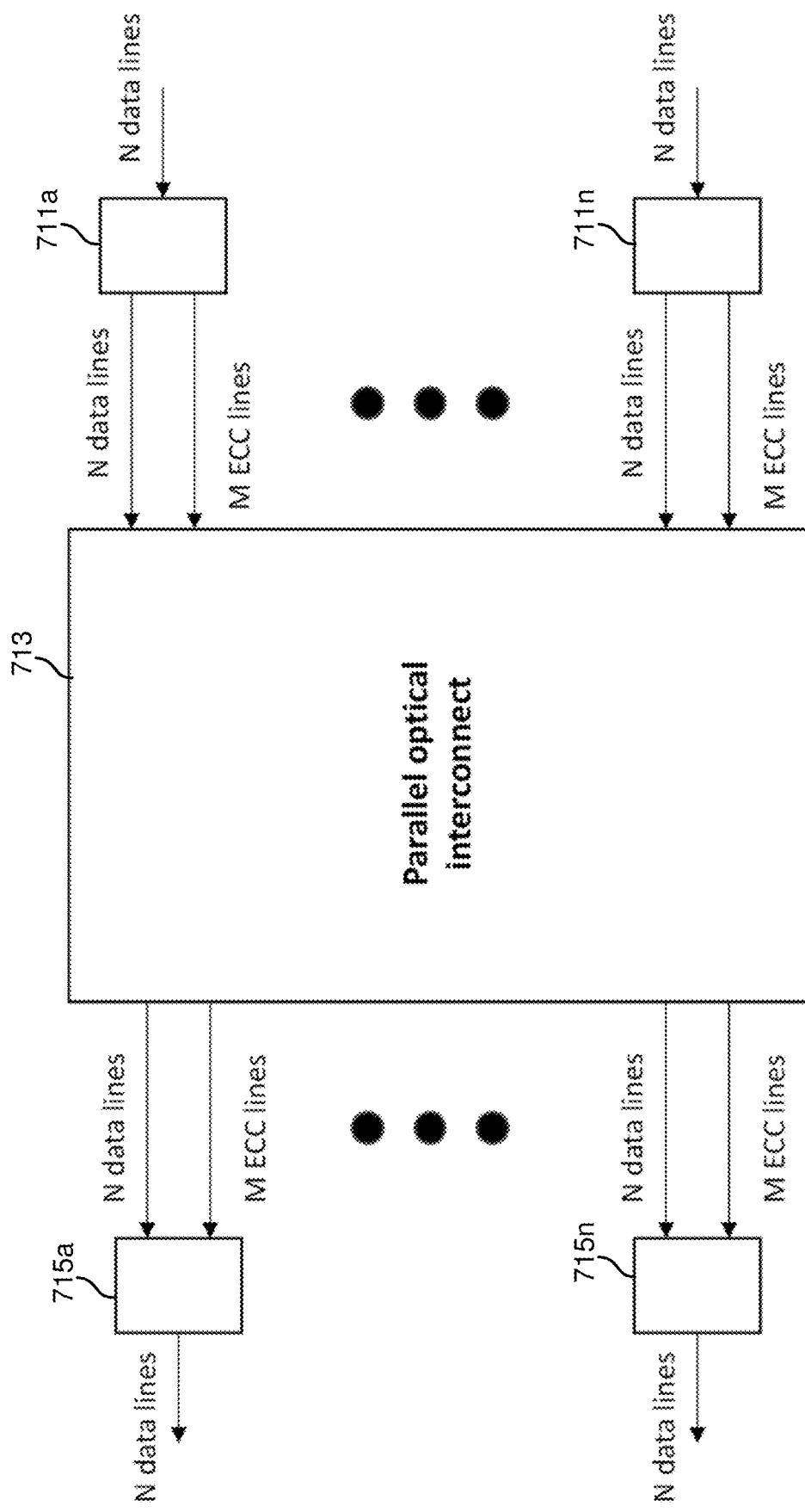
FIG. 7 is a block diagram of an example system in which error correction coding is provided within an inverse multiplexed microLED parallel optical interconnect, with the parallel optical interconnect portion passing data signals in parallel with error correction signals, in accordance with aspects of the invention.

FIG. 7 is a block diagram of an example system in which error correction coding is provided within an inverse multiplexed microLED parallel optical interconnect, with the parallel optical interconnect portion passing data signals in parallel with error correction signals. In some embodiments of an inverse-multiplexed microLED POI, the outputs of each inverse multiplexer are input to an error-correcting code (ECC) encoder 711a-n, the output of which is M ECC lines in addition to N data lines. Each of these ECC lines is input to its own optical transmitter lane of the parallel optical interconnect 713. At the receive end, N+M receiver output lines are input to an ECC decoder 715a-n, which has N output lines. Depending on the ECC encoding scheme and the number of error-correcting code lines M, ECC can be used to correct for one or more bit errors that occur anywhere in the path between the ECC encoder and the ECC decoder.

Figure 8:
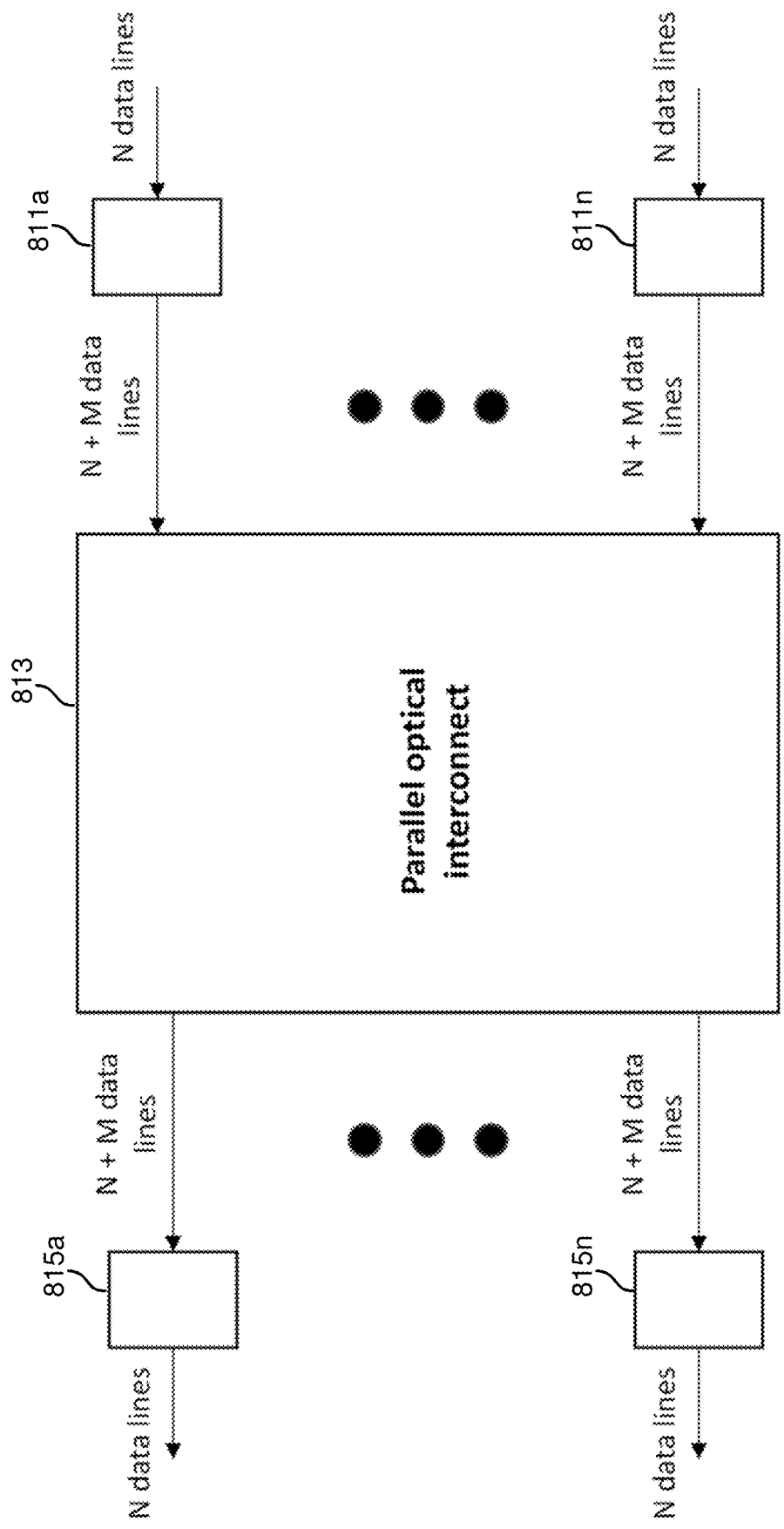
FIG. 8 is a block diagram of an example system in which redundant lanes are provided within an inverse-multiplexed microLED parallel optical interconnect, in accordance with aspects of the invention.

In the case that some of the POI lanes are not operational, redundant lanes can be added. FIG. 8 is a block diagram of an example system in which redundant lanes are provided within an inverse-multiplexed microLED parallel optical interconnect. In some embodiments of an inverse-multiplexed microLED POI, each set of N inputs is connected to n "input redundancy mapper" 811a-n that can flexibly map the N inputs to N+M outputs. Each of these outputs is then an input to a POI 813. At the output side of the POI, each set of N+M inputs is input to an "output redundancy mapper" 815a-n with N outputs, where the output redundancy mapper can map any N of the inputs to the N outputs. Each input redundancy mapper can be set so that its N inputs can be mapped to avoid up to M non-operational lanes POI lanes at its outputs. On the output side of the POI, the corresponding output redundancy mapper is configured to select the same subset of N lanes at its input that the input redundancy mapper routed signals to.

Although the invention has been discussed with respect to various embodiments, it should be recognized that the invention comprises the novel and non-obvious claims supported by this disclosure.

What is claimed is:

1. A method of providing inverse-multiplexed optical data transmission, comprising:
   demultiplexing each of a plurality of serial input electrical data signals for transmission to form a plurality of parallel input electrical data signals, with corresponding parallel input electrical data signals for each of the serial input data signals;
   driving microLEDs of an array of microLEDs to emit light based on the parallel input electrical data signals;
   passing the light through cores of a multicore fiber, with light from different microLEDs passing through different cores of the multicore fiber;
   forming parallel output electrical data signals by an array of photodetectors receiving the light passed through the cores of the multicore fiber; and
   multiplexing the parallel output electrical data signals to form serial output electrical data signals;
   wherein the array of microLEDs comprises a plurality of sub-arrays of microLEDs, and each of the corresponding parallel input electrical data signals are provided to different ones of the sub-arrays of microLEDs;
   wherein the array of photodetectors comprises a plurality of sub-arrays of photodetectors, and each of the sub-arrays of photodetectors receives light emitted by a corresponding one of the sub-arrays of microLEDs; and
   wherein the array of photodetectors comprises a plurality of sub-arrays of photodetectors, and each of the sub-arrays of photodetectors receives light emitted by a corresponding one of the sub-arrays of microLEDs; and
   further comprising, for each sub-array of microLEDs, driving a microLED of the array of microLEDs with an input electrical clock signal, passing light emitted by the at least one microLED driven by the input electrical clock signal through at least one core of the multicore fiber, and forming an output electrical clock signal by at least one photodetector of a corresponding one of the sub-arrays of photodetectors.

2. The method of claim 1, further comprising, for each sub-array of microLEDs, latching the parallel input electrical data signals using the input electrical clock signal, and for the corresponding one of the sub-arrays of photodetectors, latching the parallel output electrical data signals using the output electrical clock signal.

3. The method of claim 1, wherein different photodetectors of one of the sub-arrays of photodetectors receives light emitted by a corresponding different one of the microLEDs of the corresponding one of the sub-arrays of microLEDs.

4. A method of providing inverse-multiplexed optical data transmission, comprising:
   demultiplexing each of a plurality of serial input electrical data signals for transmission to form a plurality of parallel input electrical data signals, with corresponding parallel input electrical data signals for each of the serial input data signals;
   driving microLEDs of an array of microLEDs to emit light based on the parallel input electrical data signals;
   passing the light through cores of a multicore fiber, with light from different microLEDs passing through different cores of the multicore fiber;
   forming parallel output electrical data signals by an array of photodetectors receiving the light passed through the cores of the multicore fiber; and
   multiplexing the parallel output electrical data signals to form serial output electrical data signals further comprising driving at least one microLED of the array of microLEDs with an input electrical clock signal, passing light emitted by the at least one microLED driven by the input electrical clock signal through at least one core of the multicore fiber, and forming an output electrical clock signal by at least one photodetector of the array of photodetectors.

5. The method of claim 4, further comprising latching at least one of the parallel input electrical data signals using the input electrical clock signal, and latching at least one of the parallel output electrical data signals using the output electrical clock signal.

6. An optical communication apparatus for transmitting inverse-multiplexed data, comprising:
- an inverse multiplexer having an input for one or more serial input electrical signals and configured to produce parallel input electrical signals;
- transmitter circuitry configured to receive the parallel input electrical signals and drive microLEDs to produce parallel optical signals;
- a first optical coupling assembly to couple light from the microLEDs to a first end of a multicore fiber;
- a second optical coupling assembly to couple light from a second end of the multicore fiber to photodetectors to produce parallel output electrical signals; and
- a multiplexer having a plurality of inputs configured to receive the parallel output electrical signals and convert the parallel output electrical signals to serial output electrical signals; and further comprising:
- an error-correcting code (ECC) encoder, the ECC encoder configured to generate error correction electrical signals based on the parallel input electrical signals, and wherein the transmitter circuitry is further configured to receive the error correction electrical signals and drive additional microLEDs to produce error correction optical signals, and wherein the parallel optical signals include the error correction optical signals; and
- an ECC decoder, the ECC decoder configured to correct errors in the parallel output electrical signals.

7. The optical communication apparatus of claim 6, further comprising a latch to latch the parallel input electrical signals based on a clock signal.

8. The optical communication apparatus of claim 6, wherein the inverse multiplexer is configured to produce the parallel input electrical signals bytewise.

* * * * *